Nov. 23, 1926.　　　　　　　　　　　　　　　　1,608,113
G. E. NACE ET AL
CHUCK
Filed May 15, 1924

INVENTOR:
George E. Nace
Axel G. Lundin
BY
Sydney B. Prescott
ATTORNEYS.

Patented Nov. 23, 1926.

1,608,113

UNITED STATES PATENT OFFICE.

GEORGE E. NACE AND AXEL G. LUNDIN, OF BROOKLYN, NEW YORK, ASSIGNORS TO WAHLSTROM TOOL COMPANY, A CORPORATION OF NEW YORK.

CHUCK.

Application filed May 15, 1924. Serial No. 713,431.

This invention relates to an improvement in chucks, particularly adaptable for use in connection with taps for cutting threads in bottomed holes.

It is common practice to hold a tap in an ordinary drill chuck, and when this is done and threads are being cut in a bottomed hole, it sometimes happens that when the tap reaches the bottom of the hole, the thread is stripped or the tap breaks, this being due to failure on the part of the operator to stop the chuck at the proper time. The main object of the present invention is the production of a chuck particularly adapted for tapping purposes, in which the driving element ceases to operate the tap when the resistance reaches a predetermined limit above that within which the tapping must be done and below that which would result in thread stripping or tap breaking. A further object of the invention is the production of a device of this kind which is provided with means for varying the resistance limit in accordance with the size of the tap used. With these and other objects not specifically mentioned in view, the invention consists in certain constructions and combinations which will be hereinafter fully described and then specifically set forth in the claims hereunto appended.

Figure 1:
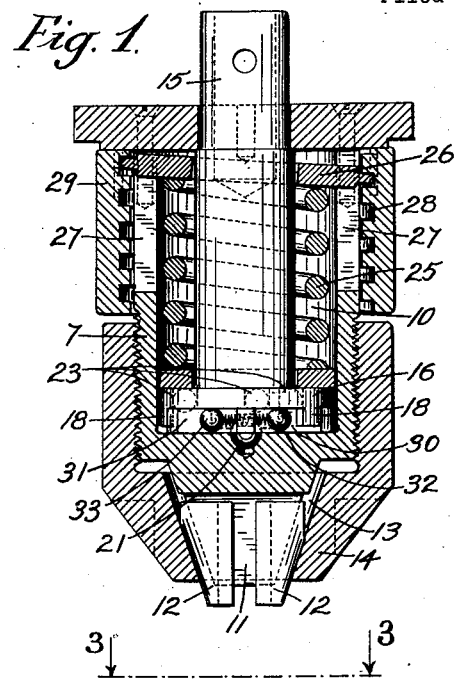
Figure 4:
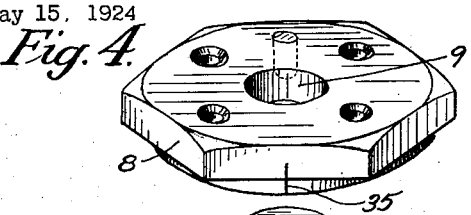
Figure 5:
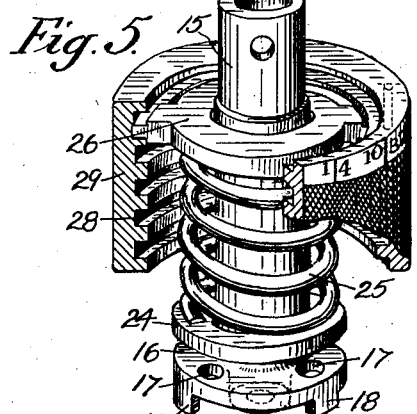
Figure 2:
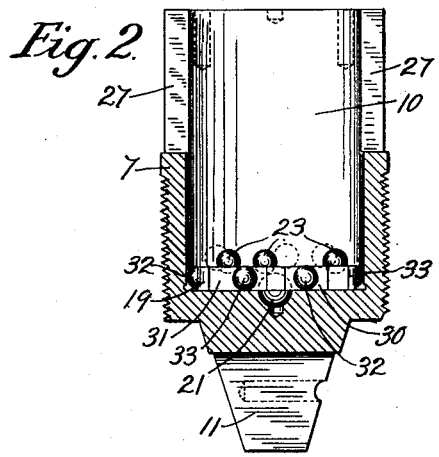
Figure 6:
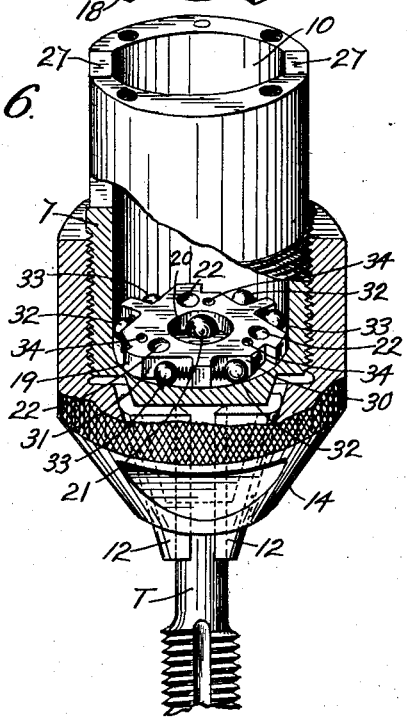
Figure 3:
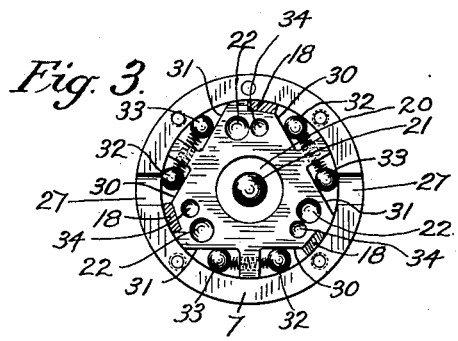

In the accompanying drawings, which form a part of this specification and in which like characters of reference indicate the same or like parts, Fig. 1 is a central sectional view of a chuck constructed in accordance with the invention; Fig. 2 is a similar sectional view of the chuck body and floating clutch member used therein; Fig. 3 is a plan view of the structure shown in Fig. 2; Fig. 4 is a detail perspective view of the cap of the chuck body; Fig. 5 is a perspective view, partly broken away, of certain parts of the structure shown in Fig. 1, certain other parts being omitted; and Fig. 6 is a perspective view, partly broken away, of the chuck body, the floating clutch member, and the tool carrying device, showing a tap in position.

In carrying the invention into effect, there is provided a hollow body having a tool carrying device at its lower end, a driving shank rotatably mounted in said body, and interposed mechanism for driving said body against resistance below a predetermined limit, and for freeing said body at said limit so that when a tap bottoms in a hole, the predetermined limit of resistance is exceeded, and the chuck is instantly freed from driving connection with the driving shank to prevent thread stripping or tap breakage. In the best constructions, there is further provided means for varying said limit in accordance with the size of the tap being used, the resistance of course varying with variously sized taps. The above mentioned parts, mechanism and means may be widely varied in construction within the scope of the claims, for the particular structure selected to illustrate the invention is but one of many possible concrete embodiments of the same. The invention therefore is not to be restricted to the precise details of the structure shown and described.

Referring to the drawings, 7 indicates a hollow chuck body provided with a cap 8 which is screwed to its upper end. This cap is provided with a central cylindrical aperture 9, and the body is provided with a cylindrical chamber 10, the axis of which is coincident with that of the aperture 9.

The body is provided with a tool carrying device of any of the well known types. As shown, however, the lower part of the body is provided with a transverse slot 11, and in this transverse slot are located two oppositely disposed tapering tool clamping jaws 12. The inclined outer surfaces of these jaws contact with the wall of a conical aperture 13 formed in a cap 14 which is screwed on the outer side of the wall of the body 7. It will be readily understood that when the shank of a tap or other tool T is placed between the jaws 12—12, and the cap 14 is screwed up on the body 7, the tool will be firmly clamped in position and caused to rotate with the chuck body, and that a reverse movement of the cap 14 will release the tool shank from the jaws 12—12.

There is further provided a driving shank 15 rotatably mounted in the aperture 9 before referred to. Within the chamber 10, the shank 15 is provided with an integral flange 16 having three holes 17 therethrough and spaced 120 degrees apart, and having three depending prongs 18. The purpose of the holes 17 and prongs 18 will be presently explained.

The shank 15 has no direct driving connection with the body 7 and in order to effect the driving of the chuck body 7 and the tool carried thereby, there is provided mechanism interposed between said driving shank and said body for driving said body against resistance below a predetermined limit, and for freeing said body at said limit for purposes hereinbefore explained. As shown, this mechanism is housed within the body and is in part carried by the shank and in part by said body. It includes a floating clutch member 19 provided with a central aperture 20 in which a reduced lower end of the shank 15 is centered, the end of the shank bearing on a ball 21 located on the axis of the chuck and embedded partly in the shank and partly in the body, as shown in Fig. 1. The floating clutch member 19 is not directly connected either to the shank 15 or to the body 7, but its upper surface is provided with three deep depressions 22 which normally lie immediately under the holes 17 of the shank flange 16. Located within the holes 17 and normally resting in the depressions 22 are three balls 23. These balls are held in the proper position by means of a collar 24 resting against the upper side of the shank flange 16, thus keeping the balls within the holes 17 with their lower parts engaging the depressions 22 of the floating clutch member. The collar 24 is held in proper position by means of a compression spring 25 which bears against it and against a compressing member 26. This compressing member projects through oppositely positioned slots 27—27 cut in the wall of the body 7; and at opposite sides outside the body 7, it is in engagement with an internal thread 28 of the circular nut 29 freely rotatable on the body. By rotation of the nut 29 the compressing member 26 is moved either upwardly or downwardly, and the thrust of the spring is thus regulated.

The floating clutch member 19 is provided with three right-hand and three left-hand peripheral cam surfaces, the former being marked 30 and the latter being marked 31. Three of what may be termed right-hand spring-pressed driving balls 32 engage the cam surfaces 30 and the inner periphery of the body. Similarly, three of what may be termed left-hand spring-pressed driving balls 33 contact with the cam surfaces 31 and the inner periphery of the chuck body. The chuck shank, being designed to drive a right-hand tap, the three prongs 18, before referred to, lie behind the right-hand driving balls 32.

The upper surface of the floating clutch member 19 is further provided with three shallow depressions 34, the purpose of which will be presently explained.

The spring compressing member 26, being set to permit the collar 24 to yield when a predetermined resistance to the turning of the tap then in use is reached, the driving shank is rotated, right-handedly in the present instance, carrying the balls 23 with it. These balls being held in the deep depressions 22 of the floating clutch member by the action of the spring 25 and collar 24, the floating clutch member is also rotated. The three right-hand driving balls 32 then become wedged between the cam surfaces 30 and the inner periphery of the chuck body, so that the chuck body and the tool carried thereby are rotated at the same speed as the driving shank 15. As the tap approaches the bottom of the hole, the resistance greatly increases and exceeds the predetermined limit set by adjustment of the spring pressing member 26. The balls 23 still confined in the holes 17 of the shank flange 16 then ride out of the deep depressions 22, forcing the collar 24 and spring 25 upwardly. Simultaneously, the prongs 18 carried by the shank 15 kick the right-hand driving balls 32 out of their wedged engagement with the cam surfaces 30 and inner periphery of the chuck body. The body is thus freed from the still rotating driving shank 15 and remains free until said shank is reversed. The operator reverses the direction of rotation of the driving shank 15 to withdraw the tap. The balls 23 are again rolled from the shallow depressions 34 into the deep depressions 22, the prongs 18 at the same time moving back to their normal position clear of the right-hand driving balls 32 and into engagement with the floating clutch member. Then the left-hand driving balls 33 come into action and coact with the prongs 18 to rotate the chuck and the tap in the reverse direction to screw the tap out of the threaded hole.

If it is desired to use a smaller tap in the chuck, the spring pressing member 26 is moved upwardly to decrease the thrust of the spring 25 and lower the predetermined resistance limit. On the other hand, if a larger tap is to be used, the spring is compressed to increase the predetermined resistance limit.

It will be noted that the floating clutch member 19 is ball driven and ball driving in one direction of rotation, and positively driven in the opposite direction by the engagement therewith of the prongs 18, and that the operating member of the means for varying the predetermined resistance limit encircles the chuck body and may be indexed, as shown in Figs. 4 and 5, to indicate the proper adjustment for different sizes of taps. For example, the cap 8 is provided with a mark 35, and the upper part of the annular nut 29 bears a series of marks, two of which are shown. When the mark ¼ is brought into register with the cap marked 35, it indicates that the resistance adjustment is correct for a quarter-inch tap; and when the mark 10/32 is brought into register with the cap marked 35, it indicates that the resistance adjustment is correct for a 10/32 tap,—and so on throughout the range of taps that can be used in the chuck.

What is claimed is:

1. A chuck comprising a hollow body provided with a tool carrying device, a driving shank rotatably mounted in said body, and interposed mechanism for driving said body against resistance below a predetermined limit and for ceasing to drive said body at said limit, said mechanism including a floating clutch member and a series of balls carried by said shank and driving said member.

2. A chuck comprising a hollow body provided with a tool carrying device, a driving shank rotatably mounted in said body, and interposed mechanism for driving said body against resistance below a predetermined limit and for ceasing to drive said body at said limit, said mechanism including a floating clutch member having a plurality of depressions in its surface and a series of balls carried by said shank and engaging said depressions.

3. A chuck comprising a hollow body provided with a tool carrying device, a driving shank rotatably mounted in said body, and interposed mechanism for driving said body against resistance below a predetermined limit and for ceasing to drive said body at said limit, said shank having a flange within said body provided with a plurality of holes therethrough, and said mechanism including a floating clutch member having a plurality of depressions in its surface, a series of balls located in said holes, and means for normally holding said balls in engagement with said depressions.

4. A chuck comprising a hollow body provided with a tool carrying device, a driving shank rotatably mounted in said body, and interposed mechanism for driving said body against resistance below a predetermined limit and for ceasing to drive said body at said limit, said shank having a flange within said body provided with a plurality of holes therethrough, and said mechanism including a floating clutch member having a plurality of depressions in its surface, a series of balls located in said holes, and a spring-pressed collar behind said flange and engaging said balls for normally holding them in said depressions.

5. A chuck comprising a hollow body provided with a tool carrying device, a driving shank rotatably mounted in said body, and interposed mechanism for driving said body against resistance below a predetermined limit and for ceasing to drive said body at said limit, said mechanism including a floating clutch member interposed between said shank and said body and having a plurality of peripheral cam surfaces, a corresponding number of balls engaging said surfaces and the inner periphery of said body, and declutching means carried by said shank.

6. A chuck comprising a hollow body provided with a tool carrying device, a driving shank rotatably mounted in said body, interposed mechanism for driving said body against resistance below a predetermined limit and for ceasing to drive said body at said limit, and means for varying said limit, said body having oppositely positioned slots in its wall, and said means including a spring within said body, a compressing member engaging said spring and projecting through said slots, and an annular nut encircling said body and engaging said member.

7. A chuck comprising a hollow body provided with a tool carrying device, a driving shank rotatably mounted in said body, interposed mechanism for driving said body against resistance below a predetermined limit and for ceasing to drive said body at said limit, and means for varying said limit, said mechanism including a ball-driven and ball-driving clutch member interposed between said shank and said body and housed within said body, and said limit varying means having an operating member encircling said body.

In testimony whereof, we have signed our names to this specification.

GEORGE E. NACE.
AXEL G. LUNDIN.